United States Patent [19]

Kiyooka

[11] Patent Number: 4,814,969

[45] Date of Patent: Mar. 21, 1989

[54] CONTROL APPARATUS

[75] Inventor: Hiroshi Kiyooka, Koyose, Japan

[73] Assignee: Canon Kabushiki Kaisha, Tokyo, Japan

[21] Appl. No.: 222,298

[22] Filed: Jul. 22, 1988

Related U.S. Application Data

[63] Continuation of Ser. No. 847,189, Apr. 2, 1986, abandoned.

[30] Foreign Application Priority Data

Apr. 4, 1985 [JP] Japan .................................. 60-70002

[51] Int. Cl.$^4$ ............................................. G06F 15/46
[52] U.S. Cl. .................................... 364/186; 364/513; 364/580; 901/46
[58] Field of Search ............... 364/184, 186, 513, 580, 364/191–193; 371/17; 901/46, 47, 49; 414/730

[56] References Cited

U.S. PATENT DOCUMENTS

| | | | |
|---|---|---|---|
| 3,939,453 | 2/1976 | Schroeder | 371/17 X |
| 4,155,116 | 5/1979 | Tawfik et al. | 364/186 |
| 4,296,409 | 10/1981 | Whitaker et al. | 364/580 X |
| 4,447,700 | 5/1984 | Cohen | 901/46 X |
| 4,481,569 | 11/1984 | Hoodbhoy | 364/513 X |
| 4,611,296 | 9/1986 | Niedermayr | 364/580 X |

OTHER PUBLICATIONS

Eberhardt, Ernst, Mörtel Gerhard Karlsruhe: Sensorausrüstung und Regelung von Greifern für Industrieroboter, VDI-Z 125 Mar. (I) (1983) No. 5, p. 147, 5.2.

Strauch, R. Friedberg/Hessen: Sensorgeführte Industrierobotersysteme, wt-zietschrift für industrielle Fertigung, 74 (1984), vol. 12, p. 721, Foreword.

Primary Examiner—Joseph Ruggiero
Attorney, Agent, or Firm—Fitzpatrick, Cella, Harper & Scinto

[57] ABSTRACT

A control apparatus for performing a self test of a robot arm or the like has a solenoid for controlling the movement of the arm, a keyboard for allowing the operator to set operation conditions of the robot, sensors for sensing the operation state of the robot such as temperatures or pressures, and a CPU for controlling the operation of the robot in accordance with detection results of the sensors. The self-test can be performed under different reset conditions to which the robot is assumed to be exposed during actual operation.

11 Claims, 17 Drawing Sheets

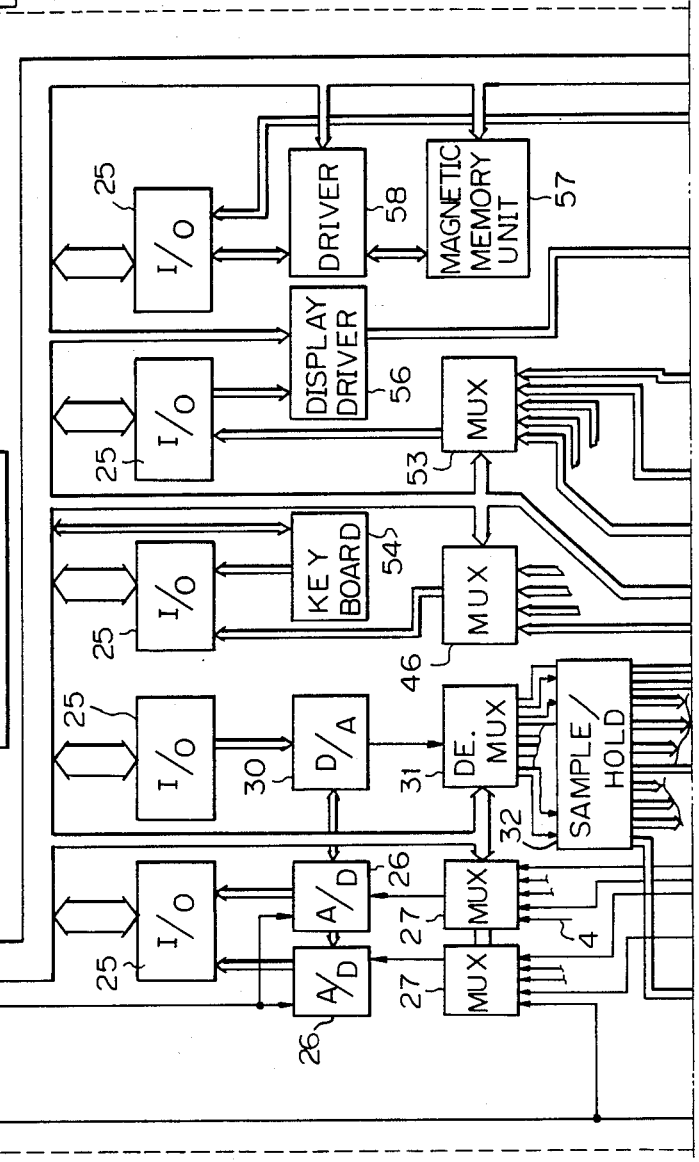

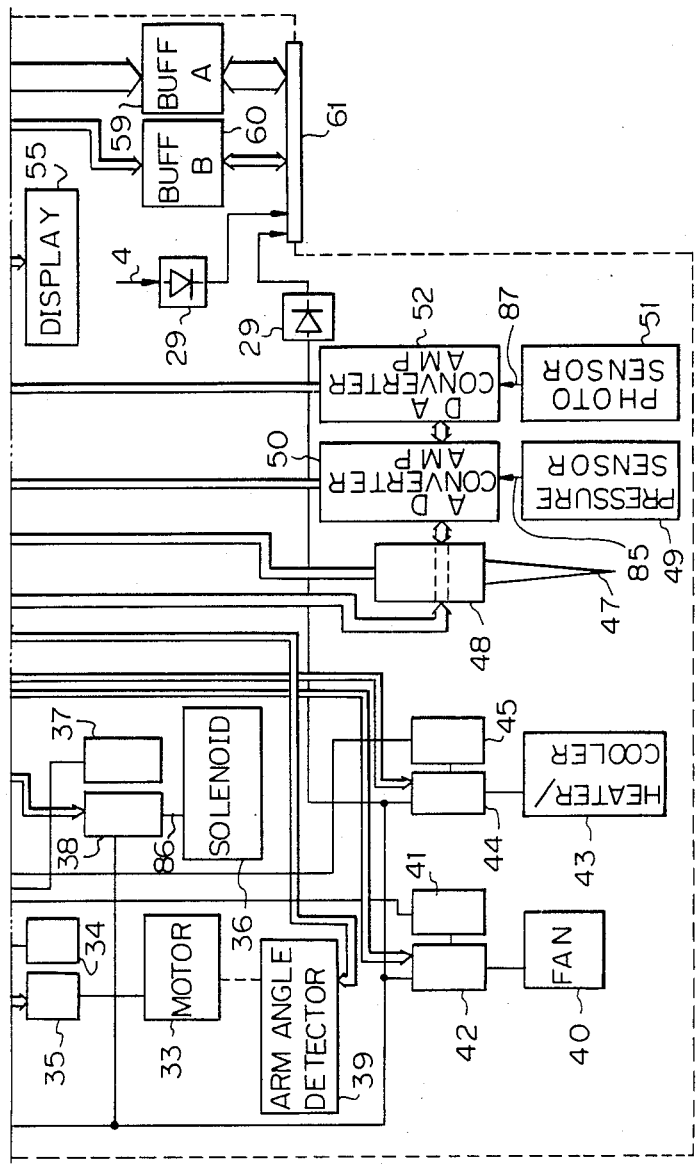

Fig.5A

| Fig.5A-1 | Fig.5A-3 |
|---|---|
| Fig.5A-2 | Fig.5A-4 |

Fig.5A-1

- ( TURN ON PS )
- RESET ELECTRIC CONTROL SYSTEM ~S1
- MEASURE PS VOLTAGE ~S2
- S3: THE MEASURED VOLTAGE WITHIN DESIRED RANGE ?
  - Y → DISPLAY ERROR ~S8
  - N → CONTROL VOLTAGE CONVERTOR TO CORRECT THE VOLTAGE WITHIN THE RANGE ~S4
- STORE EACH SIG ON BUS IN MEMORY OF SIG ~S5
- READ STORED DATA FROM THE MEMORY ~S6

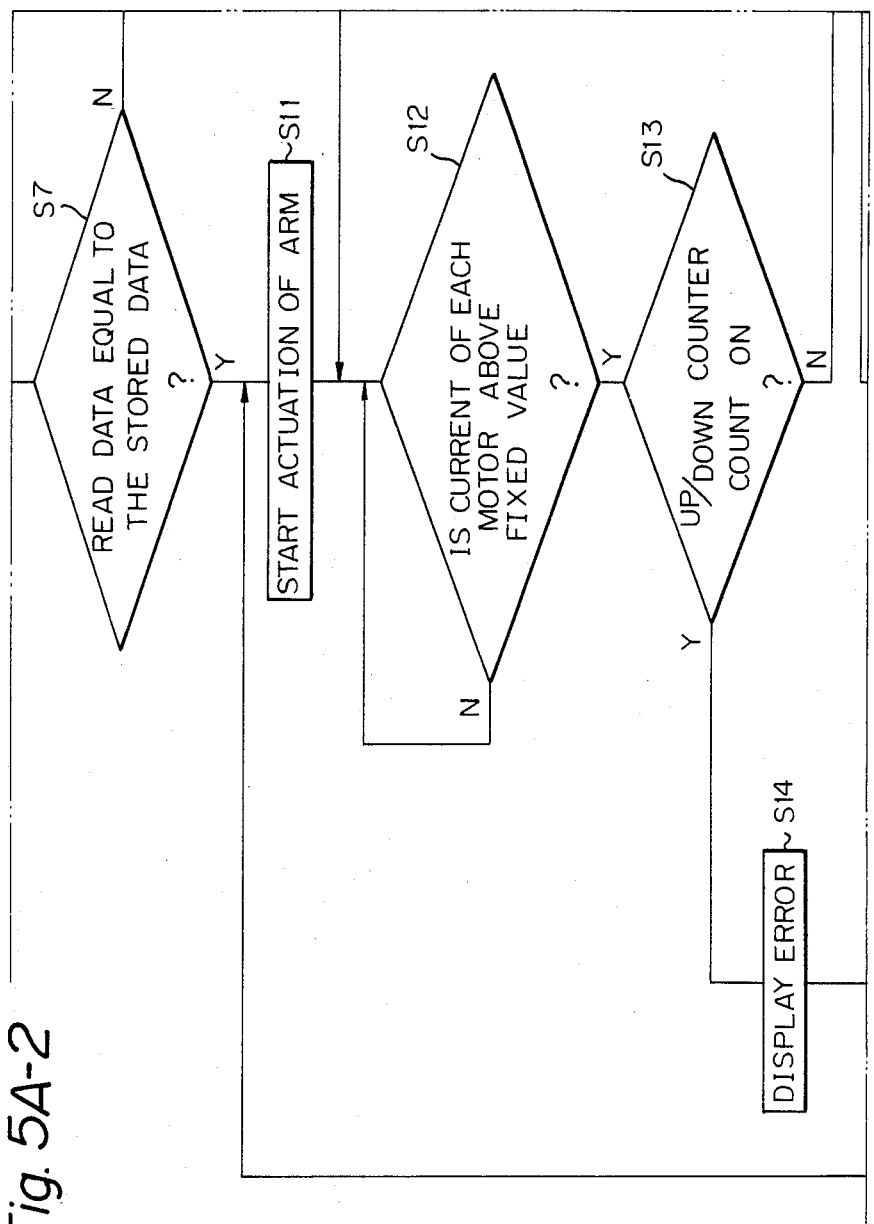

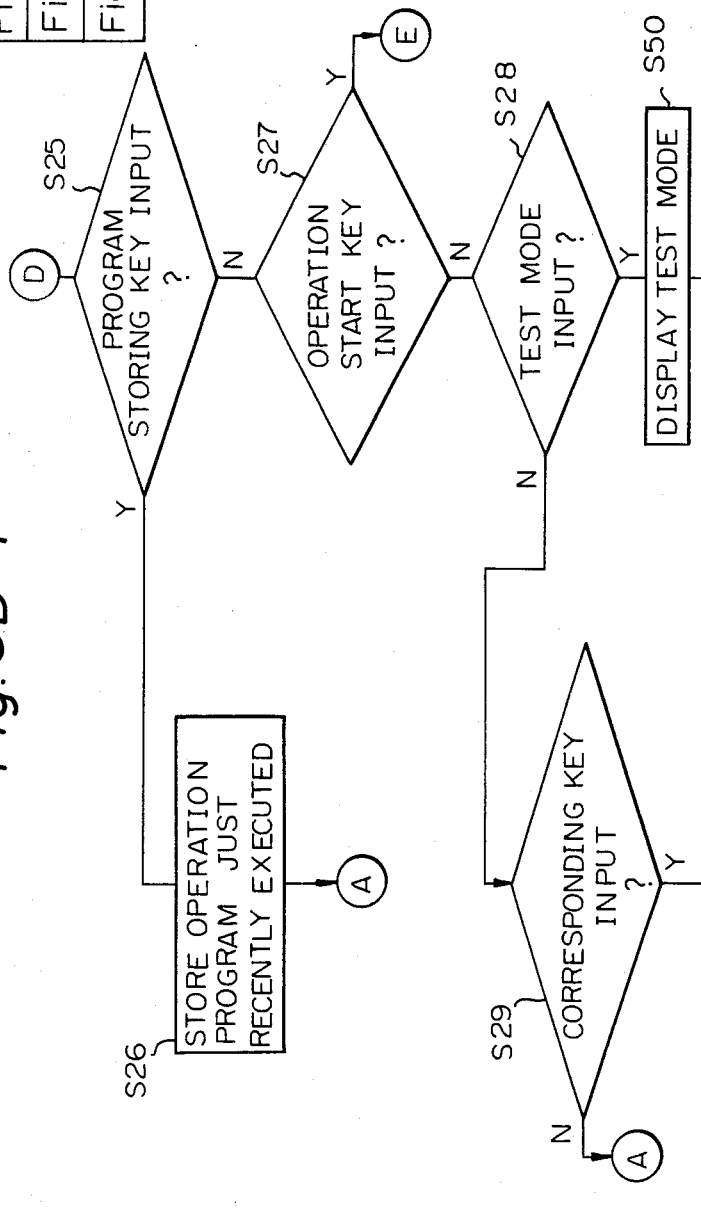

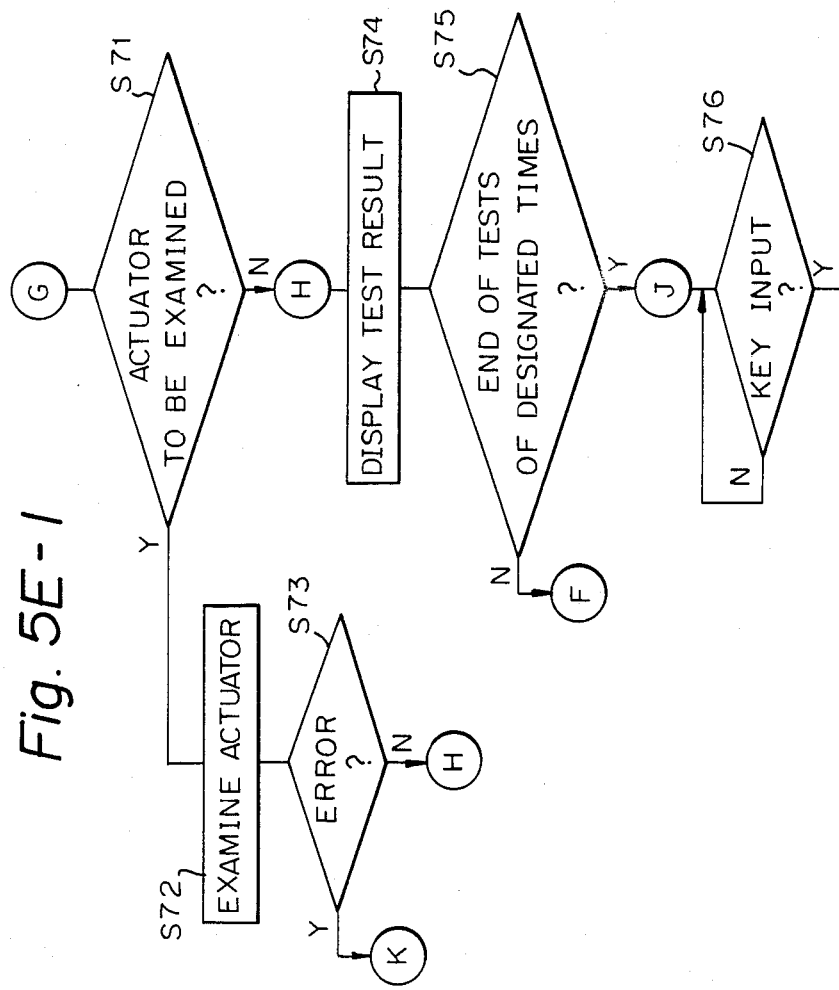

CONTROL APPARATUS

This application is a continuation of application Ser. No. 847,189 filed Apr. 2, 1986, abandoned.

BACKGROUND OF THE INVENTION

1. Field of the Invention

The present invention relates to a control apparatus with a testing function.

2. Related Background Art

The self-test technique in a conventional automatic control apparatus for a robot or the like is described, e.g., in U.S. Pat. No. 4385349, "Central Processor Supervised Controller System Having A Simulation Of The Controller In The Central Processor For Test Purposes". However, conventional control apparatuses including this control apparatus can perform self-test such as operation check only in the test operation period. However, in actual operation of a robot or the like, the actual operation conditions change very often from those tested in the test period. When the power source voltage (in particular a battery voltage) of the robot or the like is considered, the robot is more often used at a voltage which is different from the reference voltage used in testing. In view of this situation, whether a robot or the like can normally operate cannot be determined until it is actually operated.

SUMMARY OF THE INVENTION

It is an object of the present invention to eliminate the above problems.

It is another object of the present invention to improve a control apparatus having a diagnostic (or test) function.

It is still another object of the present invention to provide a control apparatus which can perform reliable testing.

It is still another object of the present invention to provide a control apparatus which can perform testing with high precision.

It is still another object of the present invention to provide a control apparatus which can perform a self test under various conditions and conditions equivalent to ambient conditions.

It is still another object of the present invention to provide a control apparatus which can recognize condition ranges in which an apparatus to be controlled thereby can be operated.

It is still another object of the present invention to provide a control apparatus which can accurately discriminate the state of an apparatus to be controlled thereby.

The above and other objects, features and advantages of the present invention will become apparent from the following description and the appended claims when taken in conjunction with the accompanying drawings.

BRIEF DESCRIPTION OF THE DRAWINGS

FIGS. 1, 2A and 2B are block diagrams showing an embodiment of the present invention;

FIGS. 5A-1 through 5A-4, 5B, 5C, 5D-1 through 5D-3, and 5E-1 through 5E-3 are flow charts showing the operation flow of the embodiment of the present invention.

DETAILED DESCRIPTION OF THE PREFERRED EMBODIMENTS

The preferred embodiment of the present invention will now be described with reference to the accompanying drawings.

Figure 1:
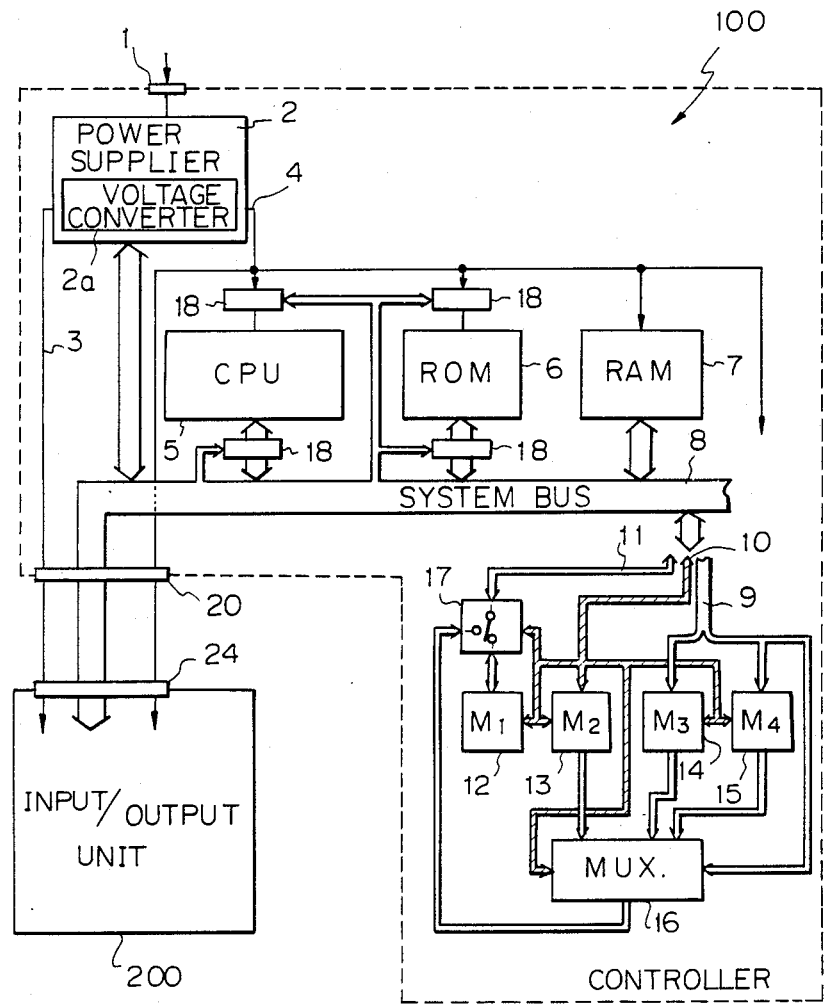

FIG. 1 is a block diagram of an embodiment wherein the present invention is applied to a robot. The apparatus of this embodiment includes a controller 100 and an input/output unit 200.

The controller 100 includes a power source supply connector (terminal) 1 and a power supplier 2. The power supplier 2 includes a power switch, a fuse, a line noise filter, a power transformer, a rectifier and the like. The power supplier 2 can comprise a battery. A voltage converter 2a (a DC-DC converter and a D/A converter) can control the output voltage by a CPU or a control section 5. The output voltage from the power supplier 2 is supplied to the respective parts of the apparatus through a power supply line 4 mainly for the IC and a power supply line 3 for supplying a power supply voltage to the other mechanical components. Although some supply lines are omitted from illustration for the sake of simplicity, the power source voltage is supplied to the respective parts in this embodiment.

The control section to be referred to as the CPU hereinafter 5 controls the overall apparatus and has an oscillator and a counter means therein. A ROM 6 stores a control program for the CPU 5, and a RAM 7 is a working RAM for the CPU 5. A system bus 8 includes address, data and control bus lines. More specifically, the system bus 8 includes an address bus line 9, a control bus line 10 and a data bus line 11. Memories M1 (12) to M4 (15) are for testing or checking the operation of the address bus line 9, the control bus line 10 and the data bus line 11. A multiplexer 16 selects one of the outputs from the memories M1 to M4 (12 to 15) and outputs the selected output. A line selector 17 switches connection of the input/output data between the data bus line 11 and the memory M1 (12) or the read data from the memories M1 to M4 (12 to 15) through the multiplexer 16 to the data bus line 11.

A switch 18 can connect or disconnect the signal lines connected to the CPU 5 and the ROM 6. A connector/terminal group 20 connects the controller 100 and the input/output unit 200. The power supply lines 3 and 4, the system bus 8 and the like of the controller 100 are connected to the input/output unit 200 through the connector/terminal group 20. A connector/terminal group 24 for connection between the controller 100 and the input/output unit 200 is at the side of the unit 200. The components 1 to 20 can be arranged as a semiconductor integrated circuit (IC) in the controller 100. When such an IC is used, the reliability of the apparatus operation is improved. In such a case, the terminal 1 is a DC power source input terminal, and the power supplier 2 is a controllable DC-DC converter or a D/A converter.

Figures 3, 5A:
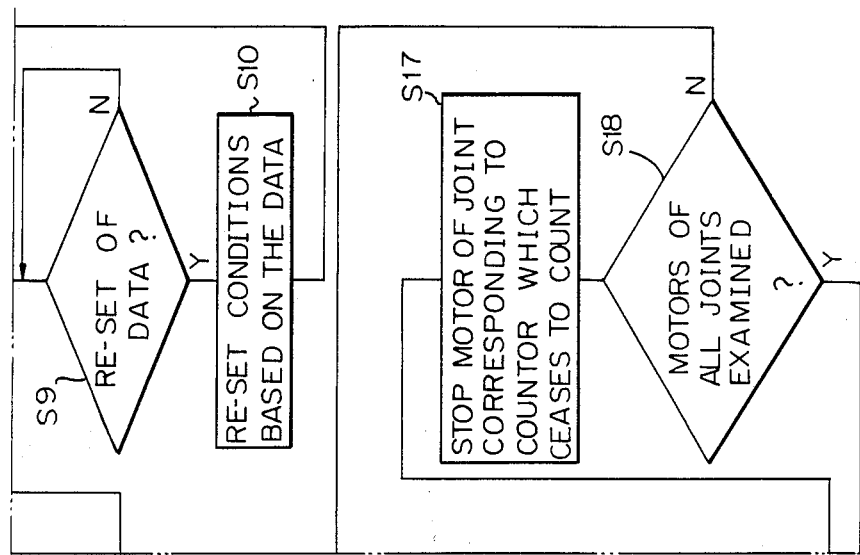
Figures 4, 5A:
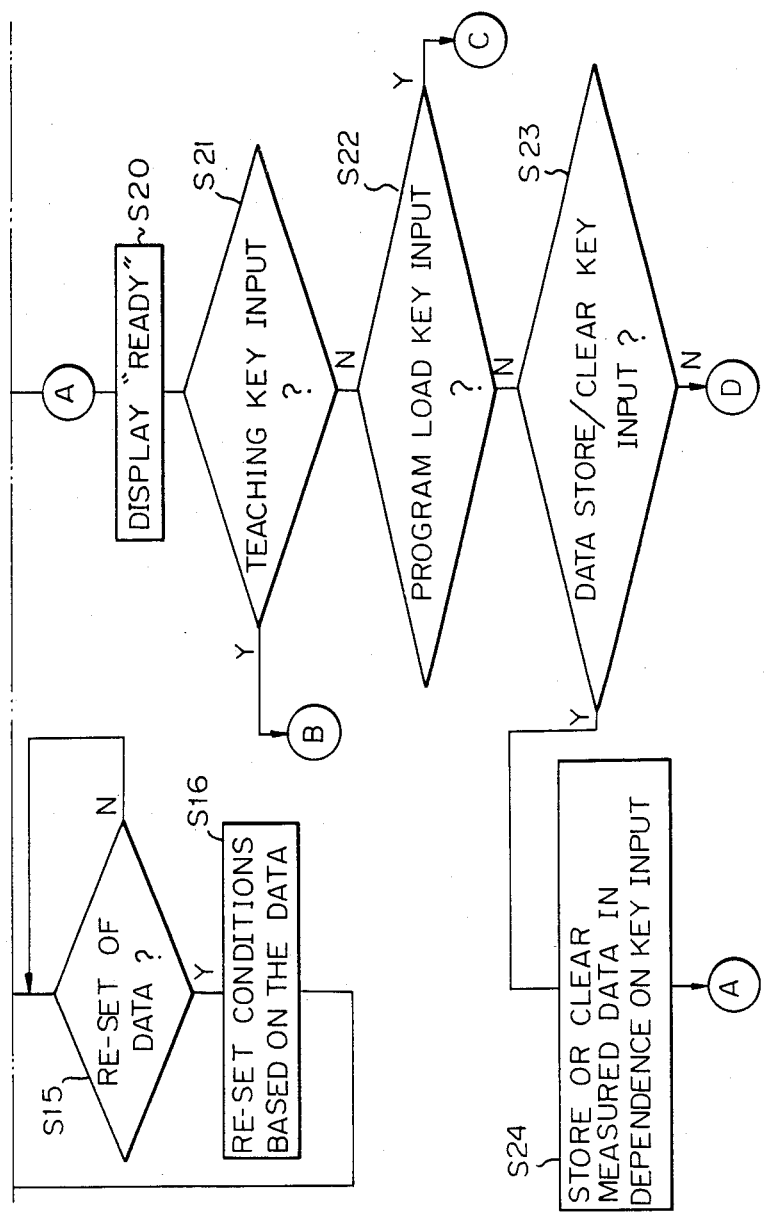
Figure 5B:
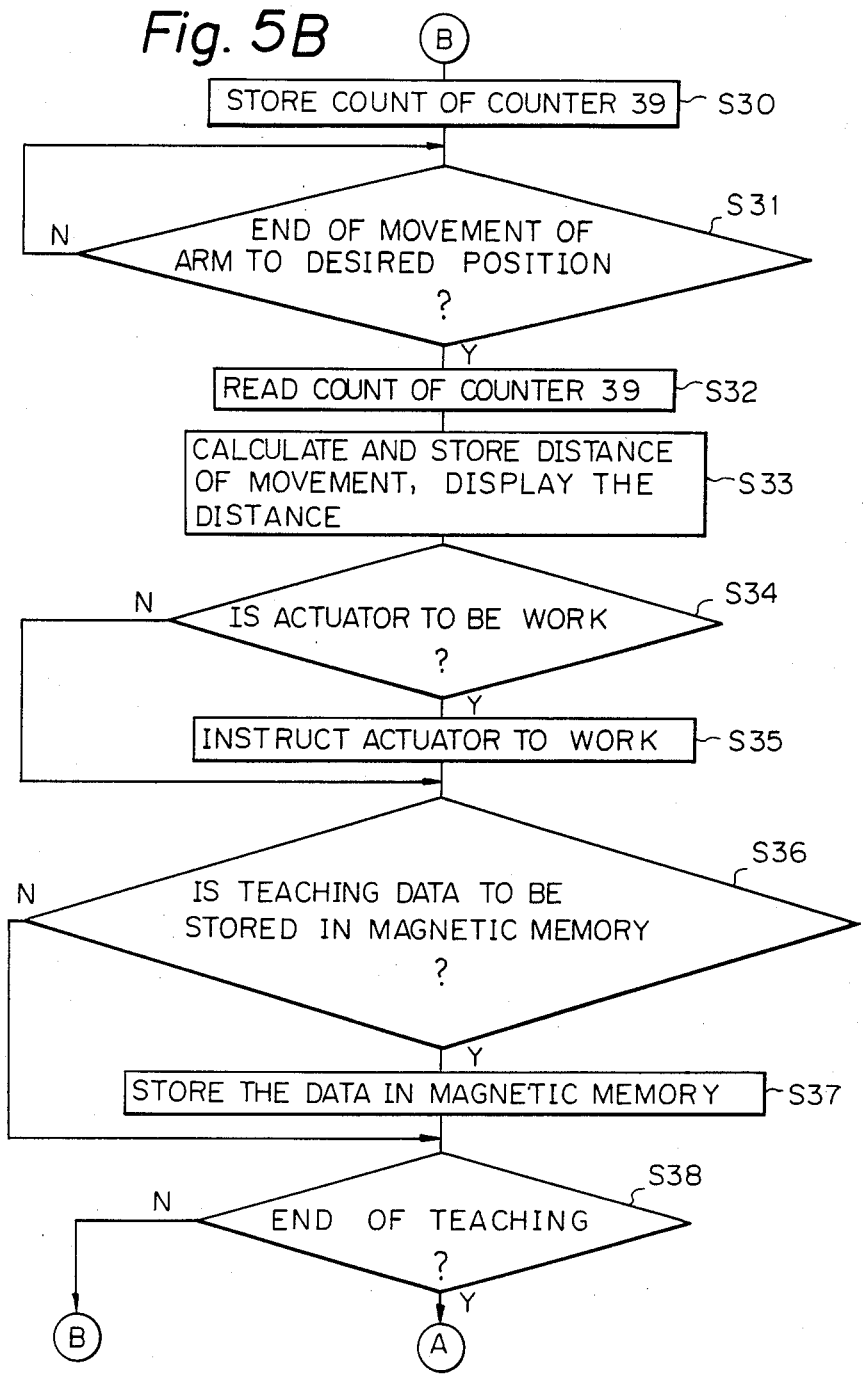
Figure 5C:
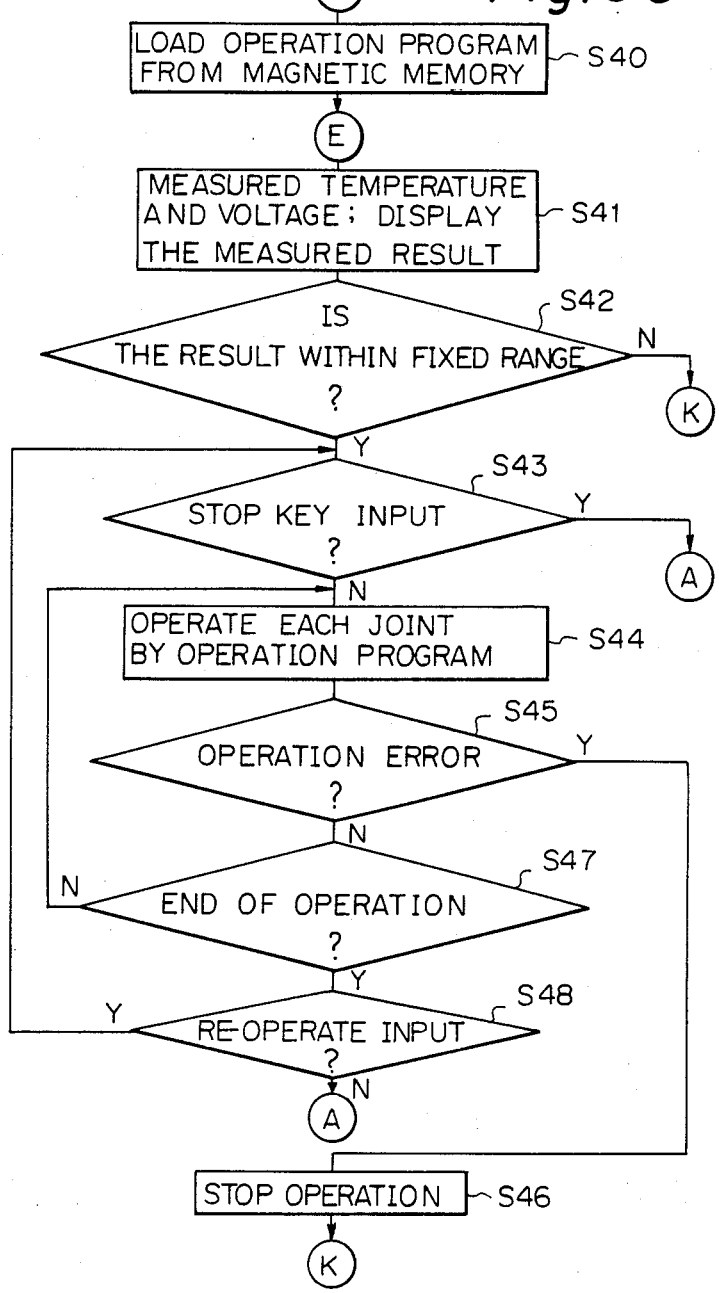
Figures 2, 5D:
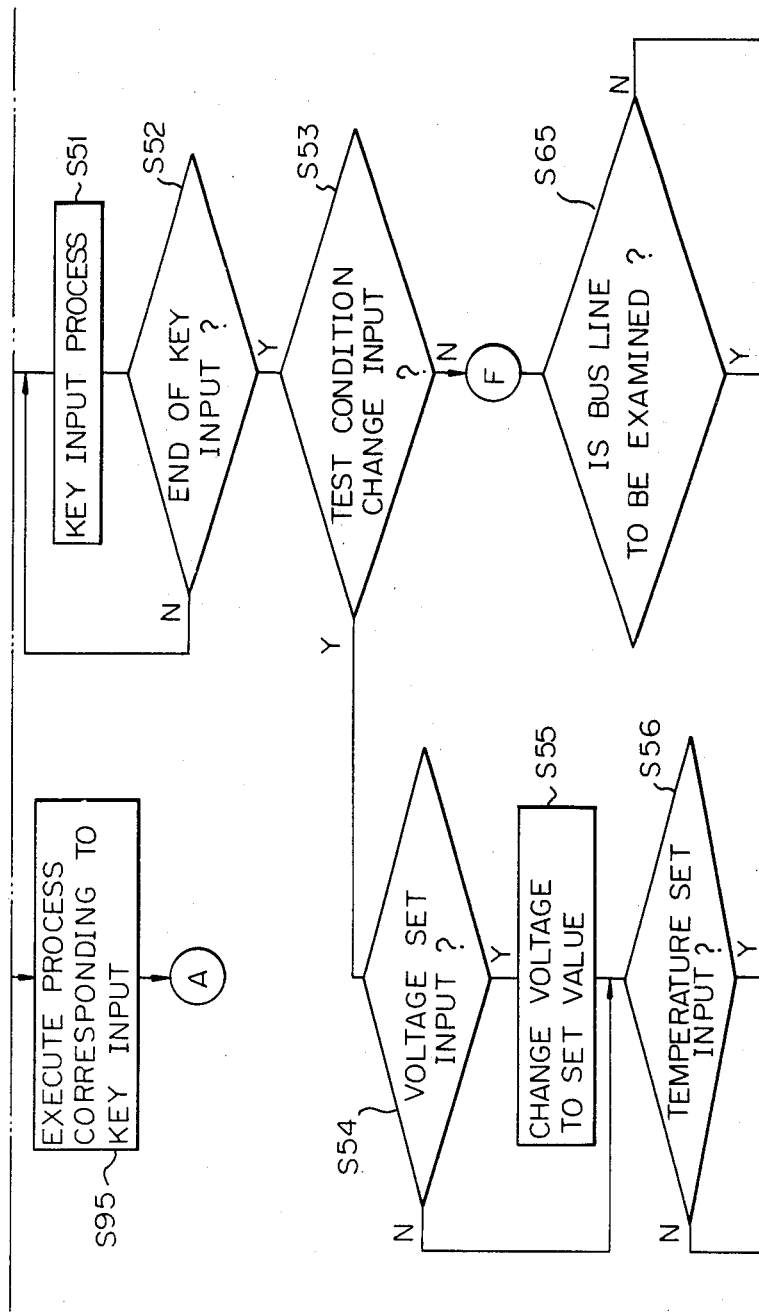
Figures 3, 5D:
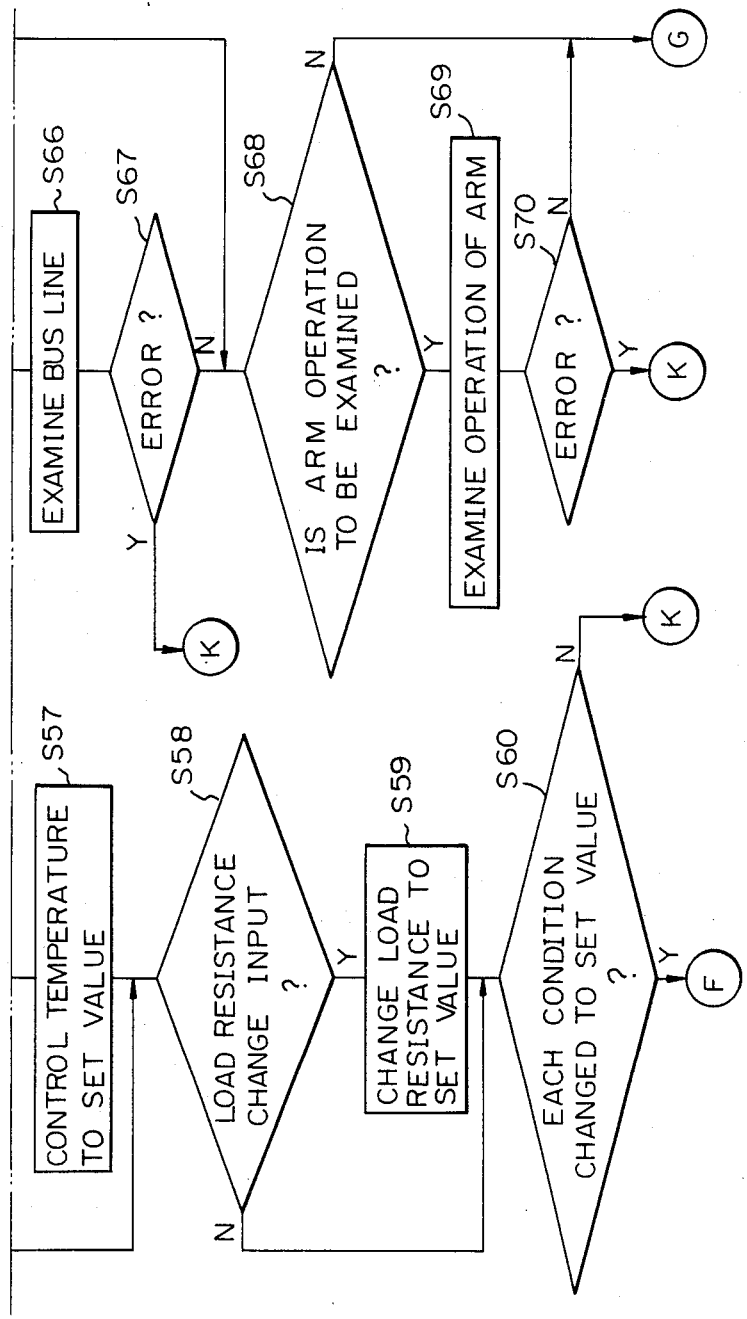
Figures 2, 5E:
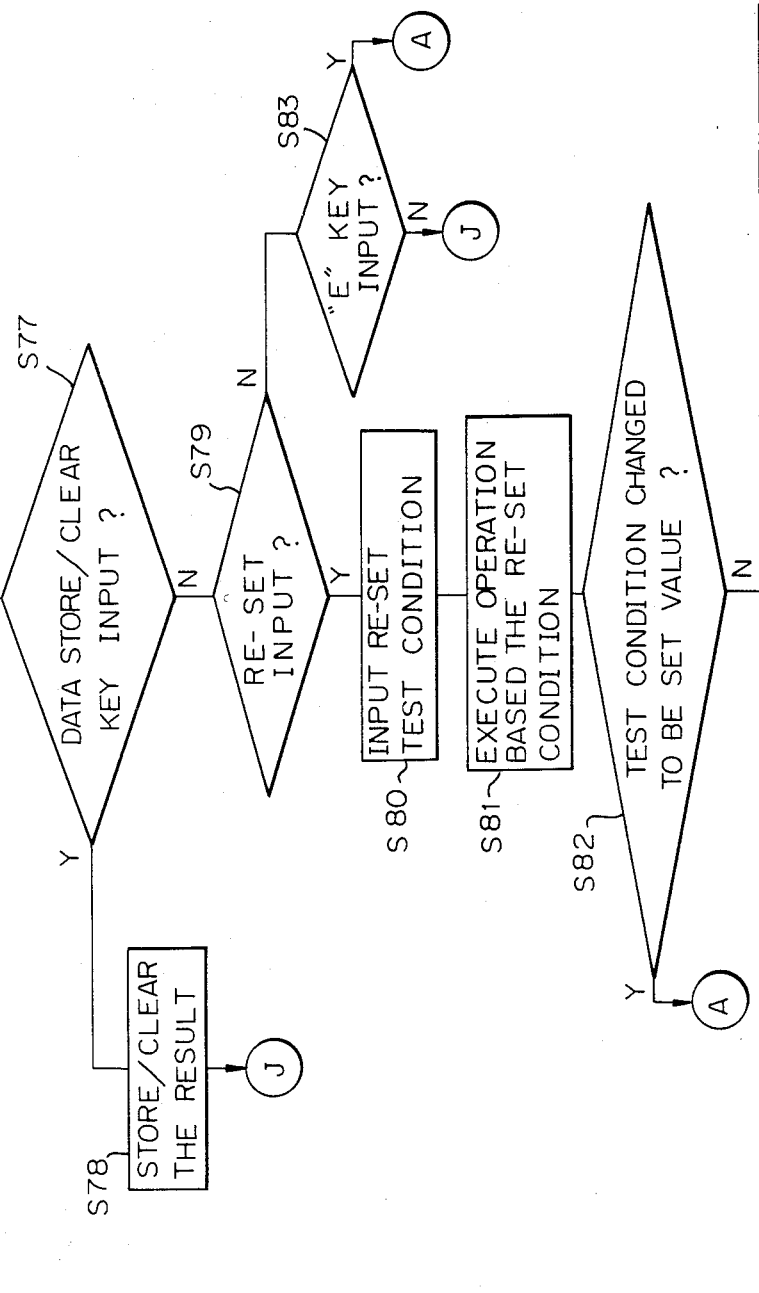
Figures 3, 5E:
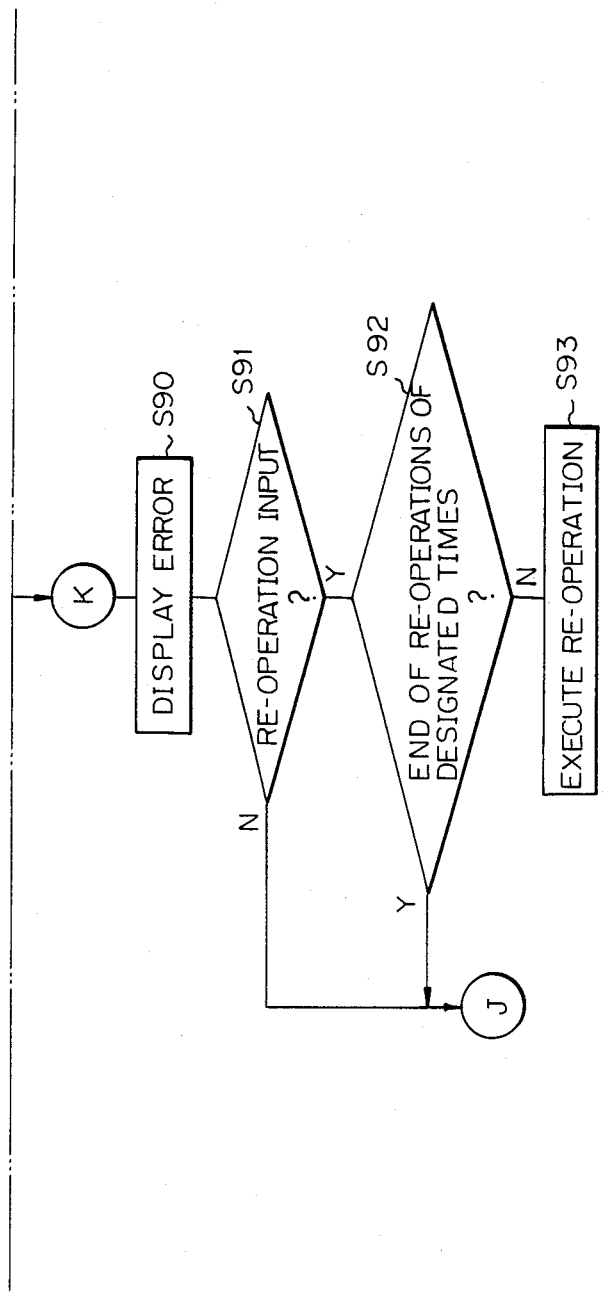

FIG. 2 (comprised by FIGS. 2A and 2B) shows details of the input/output unit 200.

Referring to FIG. 2, an I/O interface 25 controls the respective I/Os under the control of the CPU 5. An A/D converter 26 converts an analog signal corresponding to a current flowing in each I/O device into a digital signal and supplies it to the CPU 5. An A/D selector 27 selects a current measuring position among the I/O devices and connects the selected position to the A/D converter 26. A reference voltage generator 28 generates a reference voltage of the A/D converter 26. A reverse current blocking diode 29 is for preventing reverse biasing of the lines 3 and 4.

A D/A converter 30 can change the output voltage under the control of the CPU 5 as needed. In accordance with the output from the D/A converter 30, the voltage supplied to a motor 33, a solenoid 36, a fan 40 and a heater/cooler 43 is controlled so as to control their operation. A selector 31 selects an output from the D/A converter 30 and supplies the selected output to a sample/hold circuit 32 for the corresponding I/0 device. Although only one sample/hold circuit 32 is illustrated in FIG. 2, a plurality of sample/hold circuits 32 corresponding to the respective I/O devices are actually used.

The motor 33 is a drive source for the arm of the robot or the like. A decelerator 78 is directly coupled to the motor 33. When a load exceeding an upper load limit is applied, the slip mechanism of the decelerator 78 does not allow such a load to act on the motor 33. Although only one motor 33 is illustrated in FIG. 2, a similar motor is arranged for each joint of the arm of the robot.

A motor measuring circuit 34 is for a motor control circuit 35. The control circuit 35 performs motor control such as ON/OFF control or forward/reverse rotation control. The solenoid 36 is for driving and position controlling a portion of the robot which corresponds to a human finger and can allow that portion to push or pull in accordance with the direction of current supplied thereto. A solenoid measuring circuit 37 has a configuration similar to that of the circuit 36. A solenoid control circuit 38 performs push/pull operation and ON/OFF operation of the solenoid 36. The control circuit 38 has the same configuration as that of the control circuit 35.

Figure 4:
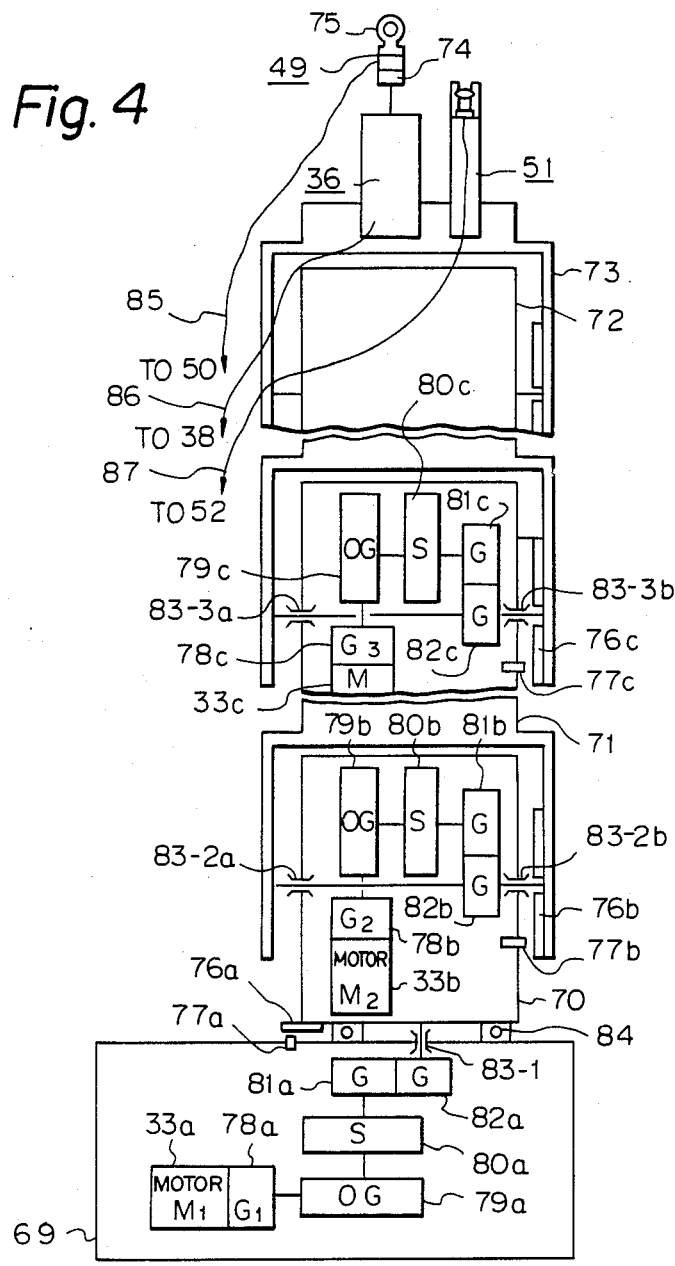
FIG. 4 is a diagram showing the structure of a mechanism of an arm section of a robot according to the embodiment of the present invention.

An arm angle detector 39 detects changes in the angle of the arm of a robot to be described later. The principle of operation of the detector 39 is as follows. A rotary encoder 76 as shown in FIG. 4 (to be described later) is mounted at the movable side (distal end side) of a joint or the like of the robot arm. A sensor 77 for optically sensing the code of the rotary encoder 76 is mounted at the proximal side with respect to the joint. The sensor 77 generates pulses the number of which corresponds to the detected change in angle of the robot arm. The pulses are supplied to an internal up/down counter (not shown) and the count is used to detect the change in angle. An output corresponding to the change in angle of the robot arm is thus supplied to the CPU 5.

The fan 40 is driven by a DC motor. The blowing direction of the fan 40 is controlled in accordance with the current direction and its blowing power is controlled by the voltage value by the CPU 5. The fan 40 takes in ambient air and blows the air to the actuator section of the heater/cooler 43 so as to control its temperature. In addition, the fan 40 supplies air to to the respective parts of the apparatus or exhausts the internal air outside the apparatus. A fan measuring circuit 41 is for measuring the current supplied to a fan control circuit 42 and changing its load resistance. The control circuit 42 performs ON/OFF control and rotating direction (air blowing direction) control of the fan 40. The heater/cooler 43 comprises a semiconductor electrical-thermal converter utilizing the Peltier effect, and can heat or cool in accordance with the current direction and control the heating or colling amount by the current amplitude. I this embodiment, a special fan (not shown) is arranged for the heater/cooler 43 so as to allow heat absorption for the opposite joint during heating and to radiate heat from the opposite joint during cooling. The fan is arranged to blow air outside the apparatus. However, a metal plate coupled to the opposite joint can be exposed outside the apparatus 68 so as to absorb heat from air or to radiate heat thereinto. A heater/cooler control circuit 44 performs ON/OFF control and current direction control for the heater/cooler 43. A heater/cooler measuring circuit 45 is for measuring current supplied to the control circuit 44 and for changing its load resistance. An arm joint angle data selector 46 selects angle data from the arm angle detector 39 mounted to each joint of the robot arm and supplies the selected data to the CPU 5.

A thermocouple 47 measures temperatures at respective portions having temperature characteristics and temperatures inside or outside the apparatus. A thermocouple IC 48 has functions of an amplifier and A/D converter and a function of a joint error correction for the voltage measured by the thermocouple 47.

A pressure sensor 49 is arranged at the actuator section at the distal end of the robot arm and detects the pushing pressure of the actuator section or lifting weight. A pressure data input circuit 50 amplifies an output from the pressure sensor 49 and converts it into a digital signal. A photosensor 51 is arranged at the actuator section at the distal end of the robot arm. The photosensor 51 detects light from an object to be measured and also detects light reflected from the object when the object is irradiated with light from a lightemitting element (not shown) mounted on the arm. An optical data input circuit 52 amplifies optical detection data from the photosensor 51, converts the amplified analog data into digital data, and supplies the digital data to the CPU 5. A data selector 53 selects one of the digital data from the thermocouple IC 48, the pressure data input circuit 50 and the optical data input circuit 52, and supplies the selected digital data to the CPU 5. A keyboard 54 is used to input various control commands and control data. A display 55 displays time-serial data or the like. A driver circuit 56 is for the display 55. A magnetic memory device 57 stores various control commands and data. A driver circuit 58 is for the device 57. Buffer circuits A and B (59 and 60) are for temporarily storing data. An input/output connector 61 is for connection with an external device. A printer or the like for printing control data is connected to the connector 61 as needed.

Figure 3:
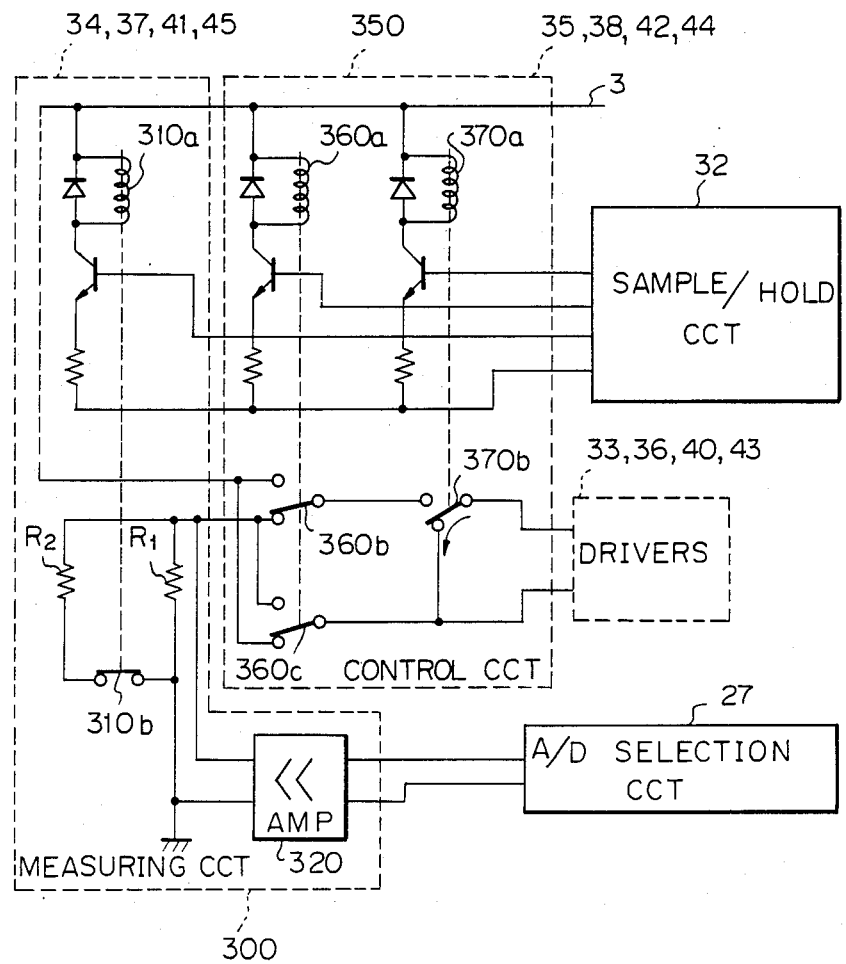
FIG. 3 is a detailed circuit diagram of a control circuit and a measuring circuit for a motor or the like shown in FIG. 2.

Measuring circuits (300) and control circuits (350) for the motor, solenoid, fan and heater/cooler are shown in detail in FIG. 3.

The measuring circuit 300 has a relay 310, which is turned on or off by a drive signal C from the sample/hold circuit 32 so as to switch between a resistor R1 and a parallel circuit of resistors R1 and R2 as a load resistance of the drivers (33, 36, 40 43). An amplifier 320 amplifies a voltage between the resistors R1 and R2 and supplies the amplified voltage to the A/D selector 27. The control circuit 350 has relays 360 and 370. The ON/OFF control of the relay 360 allows control of the operating direction of the drivers (switching between the forward and reverse rotating directions of the motor or switching between the push and pull operations of the solenoid). The relay 370 is used to perform the ON/OFF control of the drivers.

The structure of an arm of a robot will be described for a case wherein the embodiment is applied to a robot, with reference to FIG. 4.

Referring to FIG. 4, a fixed portion 69 is a robot table. A rotary table 70 rotates in a horizontal plane on the fixed portion 69. An arm (comprised of Arm I and II) of a robot is mounted on the rotary table 70. An arm II 71 corresponds to the upper arm of a human, and arm I 72 corresponds to the lower arm. Since the arm I 72 has a drive mechanism of the same construction as that for the arm II 71, it is not illustrated nor described. A portion 73 corresponds to a human hand and mounts thereon an actuator section consisting of a solenoid 36 and a photosensor 51. A movable portion 74 is fixed to the solenoid 36. The pressure sensor 49 is mounted on the distal end of the movable portion 74, and an actuator 75 is fixed to its distal end. The actuator 75 pushes or pulls in accordance with the operation of the solenoid 36. Rotary encoders 76a, 76b and 76c are arranged at the movable sides of the table 70, the arm II 71 and the arm I 72, respectively. Optical elements 77a, 77b and 77c read the rotational amounts of the encoders 76a, 76b and 76c. Decelerators 78a, 78b and 78c (G1 to G3) are directly coupled to motors 33a, 33b and 33c. Automatic gears 79a, 79b and 79c further decelerate the rotational drive forces of the motors 33a, 33b and 33c, which have been decelerated by the decelerators (G1 to G3) 78a, 78b and 78c. The gears 79a, 79b and 79c change the axial rotating direction of the forces and transmit them to slip mechanisms 80a, 80b and 80c of the arm. The slip mechanisms 80a, 80b and 80c slip and protect the gears when the forces acting on the arm or produced by the arm exceed a predetermined value.

The operator can manually move the arm to allow the slip mechanisms 80a, 80b and 80c to slip so as to perform teaching of the robot (allowing the robot to store a predetermined operation). Gears 81a, 81b and 81c and gears 82a, 82b and 82c mesh with each other. Reference numeral 83-1, 83-2a, 83-2b, 83-3a, 83-3b denote bearings. A thrust bearing 84 receives a load from the table 70 and rotatably supports it.

A signal line 85 transfers an output signal from the pressure sensor 49 to the pressure data input circuit 50. A signal line 86 connects the solenoid 36 and the solenoid control circuit 38. A signal line 87 transfers an output signal from the photosensor 51 to the optical data input circuit 52. In FIG. 4, lead wires for the electrical parts for other motors or the like are omitted for the purpose of simplifying the drawings.

The mode of operation of the embodiment having the above configuration will be described with reference to the flow charts in FIGS. 5(A) to 5(E).

When the apparatus is turned on, the electric control system is reset or initialized in step S1.

More specifically, when power is supplied to the power supplier 2 and to the respective components through the lines 3 and 4, the CPU 5 resets the respective components (parts to be controlled) in the initial state in accordance with a program stored in the ROM 6. For example, all the sample/hold circuits 32 are set to zero, and all the counters are also set to zero. In step S2, the voltage supplied to the lines 3 and 4 is selected by the A/D selector 27, and the selected voltage is measured by the A/D converter 26 with reference to the reference voltage generated by the reference voltage generator 28. In step S3, it is checked if the measured value falls within a predetermined range. If YES in step S3, the flow advances to step S5 for start test. However, if NO in step S3, the CPU 5 controls the output voltage from the voltage converter 2a in the power supplier 2 to be a predetermined value in accordance with the program stored in the ROM 6 in step S4. The flow then advances to step S5.

System bus test is performed in steps S5 to S10.

In step S5, for the start test, the memories M1 to M4 (12 to 15) are used to temporarily store the test signals for the address bus line 9, the control bus line 10, and the data bus line 11. In step S6, the CPU 5 switches the data stored in the memories M1 to M4 (12 to 15) by the multiplexer 16 and the line selector 17 and reads out the data through the date bus line 11. In step S7, the CPU 5 compares the data with previous data written in step S5. If the two data do not coincide, the flow advances to step S8 and the display 55 provides an alarm display. In step S9, a key input is awaited. When reset conditions are input, resetting is performed in accordance with the input reset conditions in step S10 and the flow returns to step S5. The system bus check is repeated in this manner. When the two data coincide with each other in step S7, checking of the system bus 8 is ended and th flow advances to step S11. In step S11, the motors 33a, 33b and 33c and the like are driven to bend the arm or rotate it in a horizontal plane. While the motors 33a, 33b and 33c are driven, it is checked in step S12 if the current flowing to each motor exceeds a fixed value. When YES in step S12, it is checked in step S13 if the output from the up/down counter is changing. When the motor current exceeds the fixed value and the counter output continues to change, there is an abnormality in the arm and the flow advances to step S14. In step S14, an error alarm is provided and the display 55 provides an error display. In step S15, condition resetting from the keyboard 54 is awaited. When conditions are reset, the flow returns to step S11 and the resetting process of the mechanical section is executed.

Resetting can be performed such that the arm is driven to be extended and then bent. In addition, the preset current value can be changed in resetting. The power supply voltage can be changed by the voltage converter 2a of the power supplier 2 in resetting so as to cope with various situations. The current measurement is performed by amplifying the voltage between the resistors R1 and R2 shown in FIG. 3 by the amplifier 320 and supplying the amplified voltage to the A/D converter 26 through the A/D selector 27. If it is determined in step S17 that the count of the joint is not changing, it means that the corresponding movable part (arm) is stopped by a stopper (not shown) and the drive force of the motor 33 is prevented from being transmitted by the slip mechanism. The CPU 5 supplies a command for stopping the motor 33 for the joint for which it is determined in step S17 that counting has been stopped. In step S18, it is checked if all joints have stopped. If NO in step S18, the flow returns to step S12 and the above processing is repeated. However, if Yes in step S18, it means that the mechnical section has been reset, and the flow advances to step S20.

Since initial resetting or initialization of the apparatus has been completed, "ready" is displayed on the display 55 in step S20. In step S21, it is checked if a teaching command is input at the keyboard 54. If YES in step S21, the flow advances to step S30 and teaching is performed. However, if NO in step S21, it is checked in step S22 if the input is a program load key input. If YES in step S22, the flow advances to step S40 and the program load processing is performed.

If NO in step S22, the flow advances to step S23. In step S23, it is checked if the input is a data store/clear key input. If YES in step S23, store or clear of the measurement data in the memories in accordance with the key input is performed, and the flow returns to step S20. If NO in step S23, the flow advances to step S25 and it is checked if the input is an operation program storing key input. If YES in step S25, the operation program executed immediately before current operation is stored in the device 57 in step S26 and the flow returns to step S20. If NO in step S25, it is checked in step S27 if the input is an operation start key input. If YES in step S27, the flow advances to step S41.

If NO in step S27, it is checked in step S28 if the input is a test mode input. If NO in step S28, it is checked in step S29 if a corresponding key input is present. If NO in step S29, it returns to step S20. A loop of step S20 to step S29 is formed to await a key input. When YES in step S29, the flow advances to step S95 and processing corresponding to the key input is executed. For example, when a resume key input is present after an interrupt key input (to be described later), processing of resuming operation from the interruption point is executed. When a test mode input is present in step S28, the test mode processing is performed in step S50.

When a teaching key input is present in step S21, the flow advances to step S30. In step S30, the current count output of a counter in the arm angle detector 39 (to be referred to as a counter 39 hereinafter) for each joint of the arm is temporarily stored, and the arm is moved to a desired position in step S31. The arm can be moved by a key input from the keyboard 54 or by manually moving it while slipping the joint. One or both methods can be adopted.

When the arm is moved, the counter 39 counts up or down in accordance with the arm movement. When the arm is moved to a target position, an "E" key indicating an end of the process is input at the keyboard 54. When an "E" key input is present, the flow advances from step S31 to step S32. In step S32, the count of the counter 39 is read. The moving distance is calculated from the difference between the current count and the current read before teaching in step S30. The distance is stored in the RAM 7 and is displayed at the display 55. Therefore, the arm can be moved to a target position through a shortest path in accordance with the distance between the target position and the arm position before movement.

When it is determined in step S34 that the actuator section at the arm distal end is to work, the actuator operation such as the operation of the solenoid 36 or designation of the light amount reading processing by the photosensor 51 is input at the keyboard 54 in step S35 and the flow advances to step S36. When it is determined in step S34 that the actuator is not to work, the flow directly advances to step S36.

When it is determined in step S36 that a teaching result store command in the magnetic memory device (to be described as a magnetic memory hereinafter) 57 is input, the data (e.g., the moving distance of the arm) is stored in the magnetic memory 57 in step S37. It is then checked in step S38 if teaching is to be ended. If YES in step S38, the flow advances to step S20, and if NO in step S38, the flow returns to step S30. If it is determined in step S36 that the teaching result is not stored in the memory 57, the flow advances to step S38.

When a program load key input is detected in step S22, the flow advances to step S40 and the operation program is loaded from the magnetic memory 57 to the RAM 7. In step S41, the operation program is executed.

Measurement of temperature and voltage is performed and the measurement results are displayed at the display 55 in step S41. In step S42, it is checked if the measurement results fall within a predetermined range. If NO in step S42, an alarm is provided and error processing is performed in step S90. When the measured results fall within the predetermined range and the operation is normal, it is checked in step S43 if a stop key input is received from the keyboard 54. If YES in step S43, the flow returns to step S20 and the operation is stopped. However, if NO in step S43, processing is performed in accordance with the operation program in steps S44 to S47.

The operation is performed for each joint. The counts of the counters 39 for the respective joints are read and the motors 33 are driven to move the joints to the target positions. During operation of the motors 33, the CPU 5 performs motor current measurement and fetching of the counts of the counters 39. If there is any abnormality such as a high motor current, the flow advances from step S45 to step S46. In step S46, the operation is stopped and the flow advances to step S90. If there is no abnormality, the target counts are reached and one operation is completed, the motors 33 are stopped and, if required, measurement by the solenoid 36 and the photosensor 51 is performed. When the operation in accordance with the program is ended, the flow advances from step S47 to step S48. It is checked in step S48 if a retry command is present. If YES in step S47, the flow returns to step S43 and the above operation is repeated. However, if NO in step S47, the flow returns to step S20 and the operation is ended.

When a test mode key input is detected in step S28, the flow advances to step S50 and the test mode process is executed. In step S50, the test mode is displayed at the display 55. In steps S51 and S52, test items, test conditions, repeating numbers, and storing items of the test results are input at the keyboard 54, and the inputs are displayed at the display 55. When all the items are input at the keyboard 54, the "E" key of the keyboard 54 is depressed and the flow advances from step S52 to step S53. In step S53, it is checked if a test condition change input is present. If NO in step S53, the flow advances to step S65. However, if YES in step S53, the flow advances to step S54.

In step S54, it is checked if the set input includes a voltage set input. If YES in step S54, process of step S55 is executed. More specifically, the CPU 5 measures the voltages of the lines 3 and 4 by the A/D converter 26. If the measures voltages are not set values, the CPU 5 controls the voltage converter 2a of the power supplier 2 and adjusts the voltages on the lines 3 and 4 to be the set values. In this case, since the A/D converter 26 measures the voltages with reference to the reference voltage generated by the reference voltage generator 28, current voltage measurement can be performed even if the drive voltage of the A/D converter 26 fluctuates to a certain extent.

Subsequently, it is checked in step S56 if a temperature set input is present. If YES in step S56, the temperatures of the designated portions are adjusted to the set values by driving the fan 40 or the heater/cooler 43 while monitoring the temperatures of these portions with a plurality of thermocouples 47. In step S58, it is checked if there is a load resistance change input. If YES in step S58, the relay 310 shown in FIG. 3 is driven in step S59.

For example, a relay contact 310b is opened to disconnect the resistor R2 to leave only the resistor R1 in the circuit and to increase the load resistance. When the relay contact 310b is closed from the open state, the load resistance can be reduced. In this embodiment, the resistance is switched in two steps. However, the load resistance can be set with a finer resolution if the resistance is switched in a larger number of steps. The resistance of the resistor R2 can be set at a value close to zero, i.e., the resistor R2 can comprise a conductor. In this case, although the current load in normal operation is small, current measurement cannot be performed.

Drive control of the relay 310 is performed in the following manner. The output from the D/A converter 30 is turned on through the I/O interface 25 by the CPU 5, and the selector 31 biases the corresponding sample/hold circuit 32 so as to switch the transistor shown in FIG. 3 and to drive the relay 310.

In step S60 it is checked if the respective conditions are changed to set values. If YES in step S60, the flow advances to step S65. However, if NO in step S60, the flow advances to step S90.

In the flow following step S65, the operation test under the test conditions set in the manner described above is performed.

In step S65, it is checked if a command for checking the bus line of the system bus 8 is input. If NO in step S65, the flow advances to step S68. However, if YES in step S65, the flow advances to step S66. In step S66, the same processing as in steps S5, S6 and S7 is performed except for start checking and setting conditions. If an error occurs in step S67, the flow advances to step S90. However, if no error is detected in step S67, the flow advances to step S68.

In step S68 it is checked if there is a check command for the mechanical section, i.e., the arm section shown in FIG. 4. If NO in step S68, the flow advances to step S71. However, if YES in step S68, the arm operation test is performed in step S69. The arm is bent following the same procedures as in steps S11 to S13. The arm is extended next and is moved until it abuts against the opposite stopper, i.e., the slip mechanisms 80a, 80b and 80c of the arm slip. During arm movement, the current measurement is performed. The arm can be moved within a predetermined range. These tests are for testing a drive voltage different from that used in start checking or for testing influence of temperature change. It is then checked in step S70 if there is an error. If YES in step S70, the flow advances to step S90. However, if NO in step S70, the flow advances to step S71.

It is checked in step S71 if there is an actuator check command. If NO in step S71, the flow advances to step S74. However, if YES in step S71, the actuator operation test is executed in step S72. The test includes an operation test of the push/pull of the solenoid 36, a pressure measurement test of the pressure sensor 49, and a photodetection test of the photosensor 51. In the pressure measurement test, for example, a weight is fixed to the actuator 75 and lifted. A pressure is applied on the pressure sensor 49, and the pressure is measured. In the test of the photosensor 51, its light-receiving section is shielded from light by inserting it into a hole or the like and a dark current is measured. If an error is detected in the tests, the flow advances from step S73 to step S90. If no error is detected, the flow advances from step S73 to step S74.

In step S74, the test results are displayed (the results can be displayed each time a different test is completed), and the flow advances to step S75. If there is a designation as to the number of repeating times for the tests, it is checked in step S75 if an end of the tests of designated times has come. If NO in step S75, the flow returns to step S65 so as to complete the tests at designated times. However if YES in step S75, the flow advances to step S76 and a key input from the keyboard 54 is awaited. When there is a key input, it is checked in step S77 if the input is a data store/clear key input. If YES in step S77, the data of the test results is stored or cleared in accordance with the key input in step S78. The data is stored in the magnetic memory 57. If the key input is not a data store/clear key input, it is checked in step S79 if the key input is a reset input. If YES in step S79, key input of reset conditions (test conditions) is performed in step S80 and reset operation is performed in step S81. The resetting operation is the same as in steps S54 to S59 described above. In step S82, it is checked if the test conditions are changed to the reset conditions. If YES in step S82, the flow returns to step S20. However, if NO in step S82, the flow advances to step S90. If NO in step S79, it is checked in step S83 if the input key is an "E" key input indicating an end of the test mode. If YES in step S83, the flow returns to step S20; otherwise to step S76.

When an error occurs in the sequence described above, an alarm display of an error state or the like is provided on the display 55 as in step S90. When an output device such as a printer is connected to the connector 61, an error state and alarm display is provided by the output device. In step S91, it is checked if there is a retry input. If YES in step S91, it is checked in step S92 if the retry operations of designated times has been ended. If YES in step S92, the flow advances to step S76; otherwise to step S93. In step S93, the retrial operation is executed.

In the above description, condition resetting is performed in accordance with conditions key input at the keyboard 54. However, the CPU 5 can automatically reset the condition in accordance with preprogrammed conditions without requiring the operator to reinput conditions. The conditions can be automatically set to coincide with the standard state (normal state) or automatically set by comparing the set conditions with error conditions and setting conditions which do not result in errors.

In the above embodiment, the present invention is applied to a robot. However, the present invention is not limited to this and can be similarly applied to other fields.

The present invention can provide particularly distinct effects when applied to various electrical or electronic equipment using ICs or electronic components, such as OA equipment (e.g., computers, copying machines, or wordprocessor), communication equipment (e.g., facsimile systems), broadcasting/reception equipment (e.g., TV sets), cameras (e.g., video cameras or electronic still cameras), medical equipment, or automatic control equipment exposed to different environmental factors.

As described above, according to the present invention, the operation conditions of an apparatus can be changed as needed and the operation test can be performed under the conditions set in this manner. Therefore, actual operation conditions of the apparatus can be checked prior to actual operation of the apparatus. After the operation test is performed, normal operation of the apparatus within a tested range is guaranteed. When an error occurs during the test, the operation conditions can be suitably changed to provide high operation reliability of the apparatus.

Since the above operation can be performed by the apparatus to be tested by itself, reliability tests can be performed before shipping from the factory or at the user's side. In addition, since the operation conditions of the apparatus can be changed, if the apparatus conditions are assumed to fall outside the rated conditions (conditions at which normal operation is not guaranteed), the operation conditions can be changed to better conditions to allow normal operation of the apparatus, thus widening the application range of the present invention.

In this manner, in addition to the self-test function under predetermined conditions as in a conventional test mode, an apparatus to be tested can be partially modified to set different conditions and to perform a test under such different conditions. With this function, an operation error which might occur under such different conditions can be detected in advance. This means, if no error occurs when the apparatus conditions are changed within a predetermined range, no operation error will occur during actual operation of the apparatus within the tested range.

When the apparatus is partially modified, it can be changed in a plurality of steps and characteristics in each step can be measured. Thus, the apparatus can be tested to estimate critical limits of the characteristics.

In the apparatus of the present invention, a predetermined situation can be assumed and measurement results in such a situation can be measured. The measured data is then compared with data immediately after the manufacture of the apparatus or with a service life characteristic curve so as to determine the remaining service life of the apparatus.

In the apparatus of the present invention, characteristics of a certain section of the apparatus can be checked and if the characteristics deviate from rated specifications, correction can be performed by numerical operation. Therefore, the same effect as that obtained with adjustment or calibration can be obtained with the apparatus of the present invention.

Within an operable condition range, a range which guarantees highest reliability or performance can be determined or achieved by partially modifying the apparatus or controlling it.

The present invention is not limited to the above embodiments and various changes and modifications can be made within the spirit and scope of the present invention.

What is claimed is:

1. A control apparatus comprising:
    operable means for working in response to a control signal;
    first control means for providing the control signal to control said operable means;
    switching means capable of switching an operation mode into a discrimination mode relating to said operable means;
    input means for inputting one of a voltage level for driving said apparatus and a temperature condition of an environment of said operable means;
    second control means for controlling one of an actual voltage level for driving said apparatus and an actual temperature of an environment of said operable means to meet the voltage level or the temperature condition input by said input means;
    detecting means for detecting an operation state of said operable means; and
    discriminating means for discriminating if said operable means is operating normally in accordance with a detection output from said detecting means in the environment obtained in the discrimination mode by said second control means.

2. A control apparatus according to claim 1, further comprising storage means for storing data based on the detection output from said detecting means.

3. A control apparatus comprising:
    operable means;
    first control means for controlling an operation of said operable means;
    input means for inputting one of a voltage level for driving said apparatus and a temperature condition of an environment of said operable means;
    second control means for controlling one of an actual voltage level for driving said apparatus and an actual temperature of an environment of said operable means to meet the voltage level or the temperature condition input by said input means;
    detecting means for detecting an operation state of said operable means; and
    discriminating means for discriminating if said operable means is operating normally in accordance with a detection output from said detecting means in the environment obtained by said second control means,
    said first control means controlling the operation of said operable means in the environment obtained by said second control means.

4. A control apparatus comprising:
    operable means;
    first control means for controlling an operation of said operable means;
    switching means capable of switching an operation mode into a discrimination mode relating to said operable means;
    input means for inputting one of a plurality of voltage levels for driving said apparatus and temperature conditions of an environment of said operable means;
    second control means for controlling one of an actual voltage level for driving said apparatus and actual temperature of an environment of said operable means to meet the voltage level or the temperature condition input by said input means, wherein said second control means controls the operation of said operable means under a first voltage level or temperature condition and thereafter under a second voltage level or temperature condition, in the discrimination mode;
    detecting means for detecting an operation state of said operable means under each of the environmental conditions; and
    discriminating means for discriminating if said operable means is operating normally in accordance with a detection output from said detecting means in each environment obtained by said second control means.

5. A control apparatus according to claim 4, further comprising storage means for storing data based on the detection output from said detecting means.

6. A control apparatus according to claim 3, wherein said first control means controls the operation of said operable means under a first environmental condition and thereafter under a second environmental condition in the discrimination mode.

7. A control apparatus according to claim 3, further comprising storage means for storing data based on the detection output from said detecting means.

8. A control apparatus according to claim 1, wherein said first control means controls the operation of said operable means under a first environmental condition and thereafter under a second environmental condition in the discrimination mode.

9. A control apparatus according to claim 1, further comprising display means for displaying the result of discrimination by said discriminating means.

10. A control apparatus according to claim 4, further comprising display means for displaying the result of discrimination by said discriminating means.

11. A control apparatus according to claim 3, further comprising display means for displaying the result of discrimination by said discriminating means.

* * * * *

UNITED STATES PATENT AND TRADEMARK OFFICE
CERTIFICATE OF CORRECTION

PATENT NO. : 4,814,969
DATED : March 21, 1989
INVENTOR(S) : Hiroshi Kiyooka

It is certified that error appears in the above-identified patent and that said Letters Patent is hereby corrected as shown below:

Title page:

[75] Inventors:

"Hiroshi Kiyooka, Koyose, Japan" should read
--Hiroshi, Kiyooka, Tokyo, Japan--.

COLUMN 6:

Line 24, "th" should read --the--.

Signed and Sealed this

Sixteenth Day of October, 1990

Attest:

HARRY F. MANBECK, JR.

*Attesting Officer*     *Commissioner of Patents and Trademarks*